June 14, 1960 | J. H. HAM, JR., ET AL | 2,941,043

MAGNETIC DRUM REPERTORY DIALER

Filed Aug. 13, 1957 | 8 Sheets-Sheet 1

INVENTORS: J. H. HAM, JR.
H. J. HERSHEY
L. A. HOHMANN, JR.
F. W. KINSMAN

BY John E. Wagner
ATTORNEY

June 14, 1960 J. H. HAM, JR., ET AL 2,941,043

MAGNETIC DRUM REPERTORY DIALER

Filed Aug. 13, 1957 8 Sheets-Sheet 2

INVENTORS: J. H. HAM, JR.
H. J. HERSHEY
L. A. HOHMANN, JR.
F. W. KINSMAN

BY John E. Wagner
ATTORNEY

June 14, 1960 J. H. HAM, JR., ET AL 2,941,043

MAGNETIC DRUM REPERTORY DIALER

Filed Aug. 13, 1957 8 Sheets-Sheet 3

INVENTORS: J. H. HAM, JR.
H. J. HERSHEY
L. A. HOHMANN, JR.
F. W. KINSMAN

BY John E. Wagner
ATTORNEY

June 14, 1960 J. H. HAM, JR., ET AL 2,941,043

MAGNETIC DRUM REPERTORY DIALER

Filed Aug. 13, 1957 8 Sheets-Sheet 4

INVENTORS: J. H. HAM, JR.
H. J. HERSHEY
L. A. HOHMANN, JR.
F. W. KINSMAN

BY John E. Wagner
ATTORNEY

June 14, 1960 J. H. HAM, JR., ET AL 2,941,043

MAGNETIC DRUM REPERTORY DIALER

Filed Aug. 13, 1957 8 Sheets-Sheet 5

INVENTORS: J. H. HAM, JR.
H. J. HERSHEY
L. A. HOHMANN, JR.
F. W. KINSMAN

BY John E. Wagner
ATTORNEY

INVENTORS J. H. HAM, JR.
H. J. HERSHEY
L. A. HOHMANN, JR.
F. W. KINSMAN
BY John E. Wagner
ATTORNEY INVENTORS J. H. HAM, JR.
H. J. HERSHEY
L. A. HOHMANN, JR.
F. W. KINSMAN
BY John E. Wagner
ATTORNEY

INVENTORS J. H. HAM, JR.
H. J. HERSHEY
L. A. HOHMANN, JR.
F. W. KINSMAN

BY John E. Wagner
ATTORNEY

United States Patent Office 2,941,043
Patented June 14, 1960

2,941,043

MAGNETIC DRUM REPERTORY DIALER

James H. Ham, Jr., and Harold J. Hershey, Indianapolis, Ind., Lawrence A. Hohmann, Jr., Chatham, and Frank W. Kinsman, Madison, N.J., assignors to Bell Telephone Laboratories, Incorporated, New York, N.Y., a corporation of New York Filed Aug. 13, 1957, Ser. No. 677,976

22 Claims. (Cl. 179—90)

This invention relates to telephone calling devices and more particularly to repertory dialers.

In the art of telephone substation apparatus, the need is felt for some form of mechanical assistance to the subscriber in setting up calls. The objective is to eliminate the, at times, burdensome technique of manipulating the telephone finger wheel several times to effect the transmission of the necessary pulses to the telephone central office in order to establish a call. The burden of this operation is particularly noticeable in the case of a subscriber who calls the same number frequently. In the past, several approaches have been taken in the design of repertory dialers. Attachments to the telephone set have been proposed which, under the control of the subscriber, physically manipulate the dial by insertion of a member into the appropriate opening of the finger wheel, displace it the required amount for each digit and release the wheel. Devices of this type often prove cumbersome, interfere with the normal use of the telephone and require rather accurate positioning and release of the member which operates the finger wheel so as to obtain the correct digit and so as to avoid interference with the run-down operation of the dial during which time the signal pulses are transmitted. Other proposals include the use of segmented or perforated code discs which reproduce pulses similar to dial pulses under the control of a single key by the subscriber. This latter type of repertory dialer eliminates the possible interference with the dial since the dial is not displaced during repertory operation. One rather practical difficulty involved in this latter type of apparatus is that the subscriber ordinarily is not able to change rapidly at will the telephone numbers stored in the dialer. Also additional apparatus allowing the subscriber to punch or segment his own cards is necessary or they are supplied by the company providing telephone service with a necessary delay.

These deficiencies in repertory dialers may be eliminated by the use of a storage medium for the recorded numbers which may readily be changed by the subscriber without the replacement of parts or discs and through a simple operation. The use of magnetic recording on a drum or tape affords just such a storage medium. The copending application of A. E. Johanson, Serial No. 621,446, filed November 9, 1956, discloses such a method of number storage employing a magnetic drum and an associated electromagnetic transducer.

With this understanding of the state of the art, it is a general object of this invention to improve repertory dialers. A more specific objective of this invention is to provide a repertory dialer employing magnetic recording and affording the subscriber the opportunity to record and signal employing either a conventional telephone set without interference from the repertory dialer or by means of the repertory dialer but under the complete control of the telephone set.

Another object of this invention is to provide for the storage of a plurality of numbers on a recording medium on a semipermanent basis.

Another object of this invention is to afford the recording and storage of numbers on a transient basis during normal use of the telephone set.

Still another object of this invention is to provide means for storing numbers of any required number of digits and thereafter to be rapidly conditioned for use.

Still another object of this invention is to facilitate the subscriber's termination of a call during the signaling cycle under control of the repertory dialers as well as the telephone set.

These and other objects of this invention are accomplished in one embodiment thereof which comprises a standard telephone set including switchhook contacts connecting the set to the line and having a dial including pulsing contacts and off-normal contacts as are usually connected in the receiver circuit. Electrically connected to the telephone set and under the control of the switchhook, pulsing, and off-normal contacts is the repertory dialer including a magnetizable drum having, for example, fifty channels arranged side by side each extending around its periphery. The drum is journaled for rotation and driven by a motor. An electromagnetic transducer is slidably positioned along the length of the drum whereby it is placed in juxtaposition with any of the fifty channels. A name display overlies the drum apparatus and includes an indicator bar affixed to the transducer indicative of its position along the magnetic drum. Manual controls are included for moving the transducer and for conditioning the apparatus for recording, calling, and rapid resetting. A control circuit is operative in response to the telephone set in conjunction with the control buttons and the position of the magnetic drum for carrying out the cycles of record and call.

These and other features of this invention may be understood by reference to the following detailed description and the accompanying drawing in which:

Fig. 1 is a perspective view of the repertory dialer apparatus and control unit housing of this invention shown with a conventional telephone subscriber set;

Figs. 2A and 2B constitute plan views of opposite ends of the repertory dialer apparatus of Fig. 1 with the cover removed and portions broken away for greater clarity;

Figure 5:
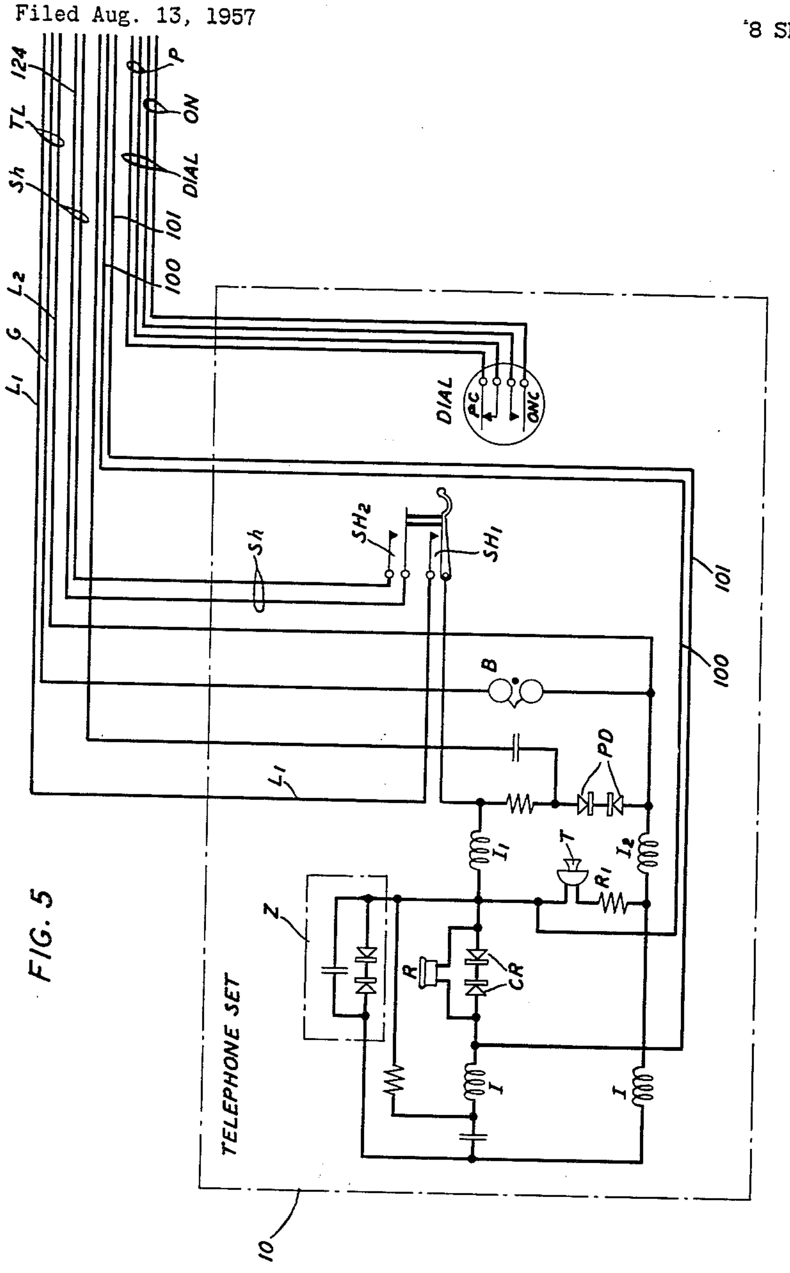
Figure 8:
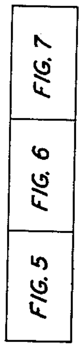
Figure 6:
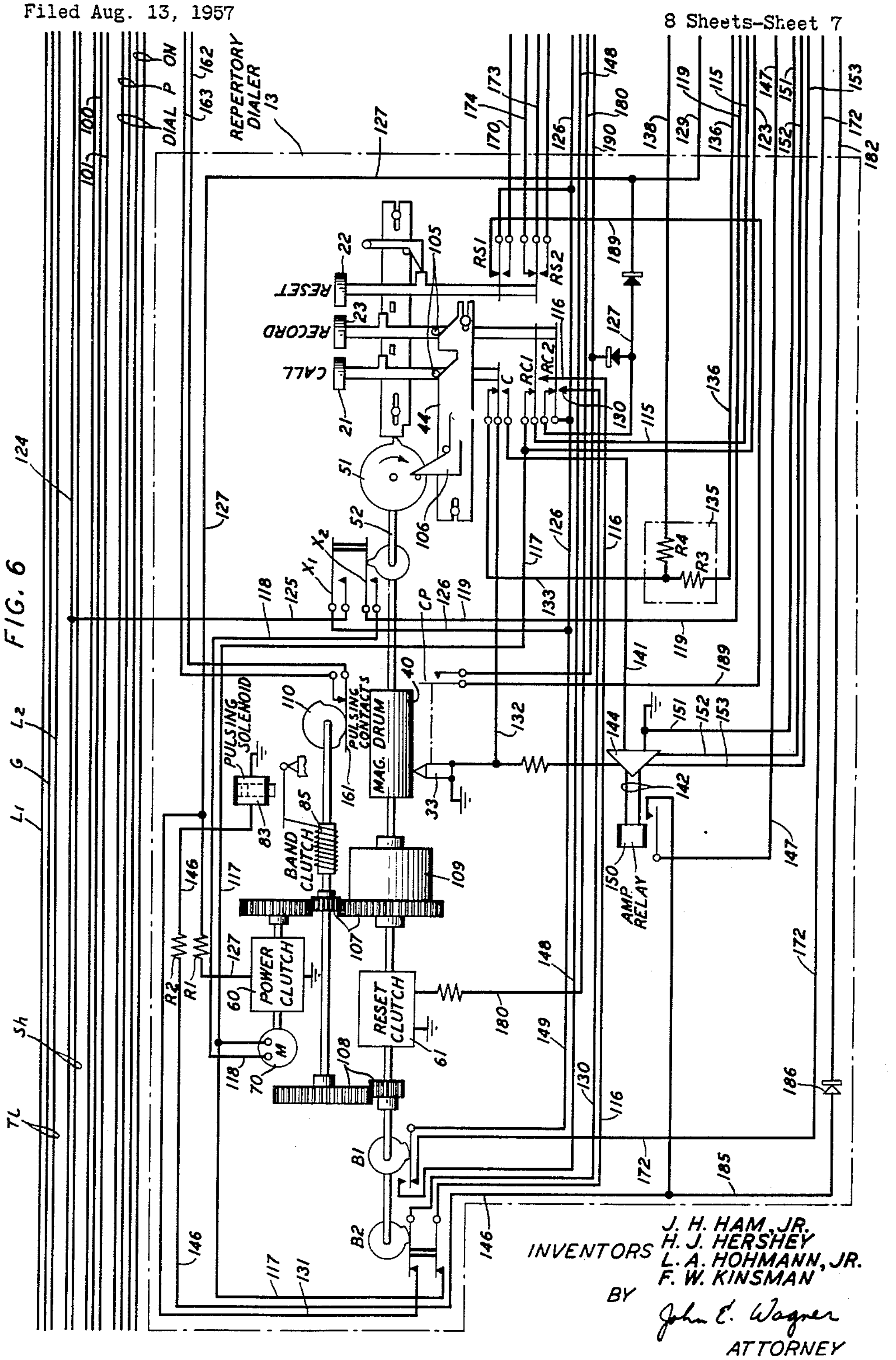
Figure 7:
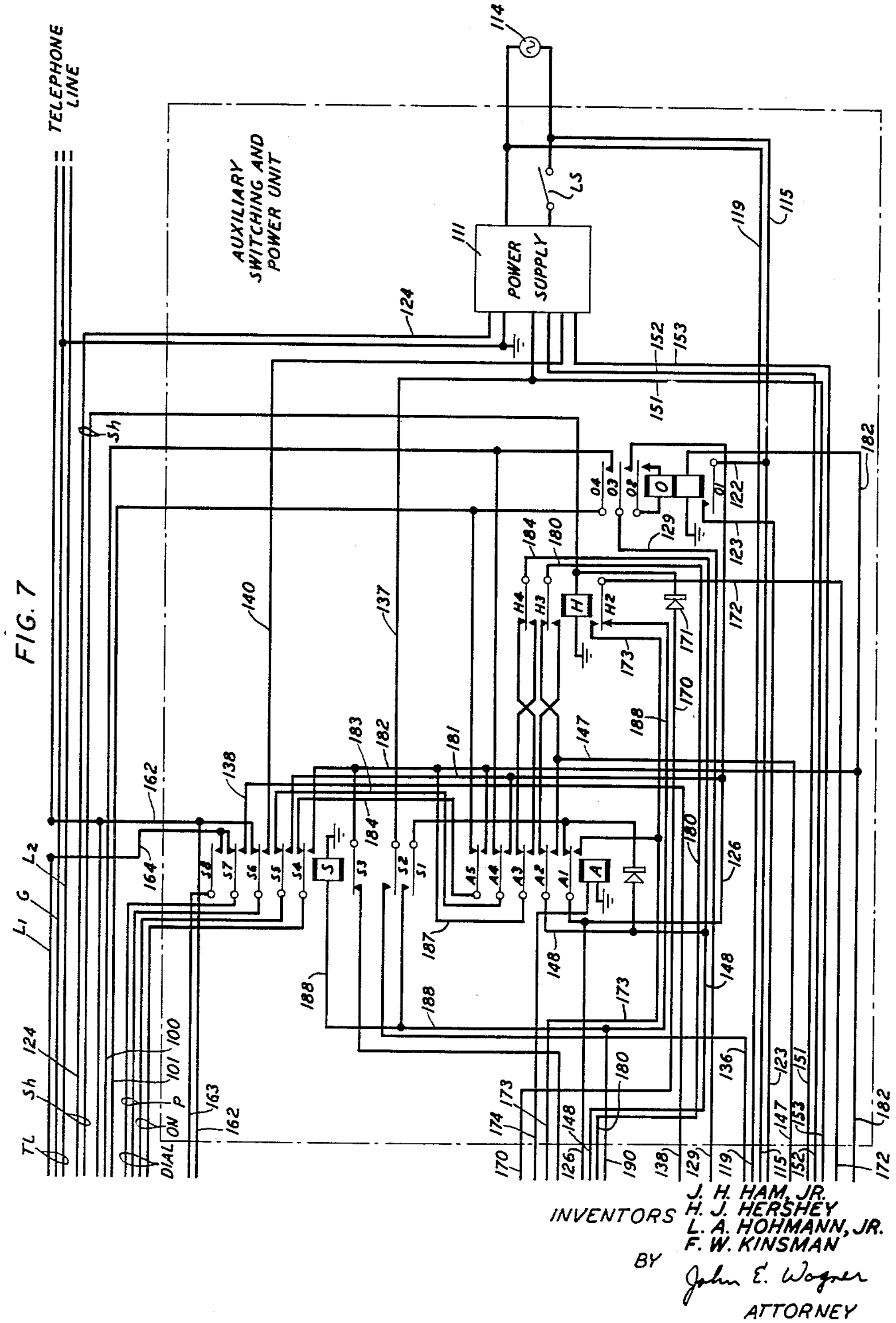

Figs. 5, 6, and 7 constitute an electrical schematic diagram of this invention; and Fig. 8 illustrates the arrangement of Figs. 5, 6, and 7.

*Mechanical components*

Figure 1:
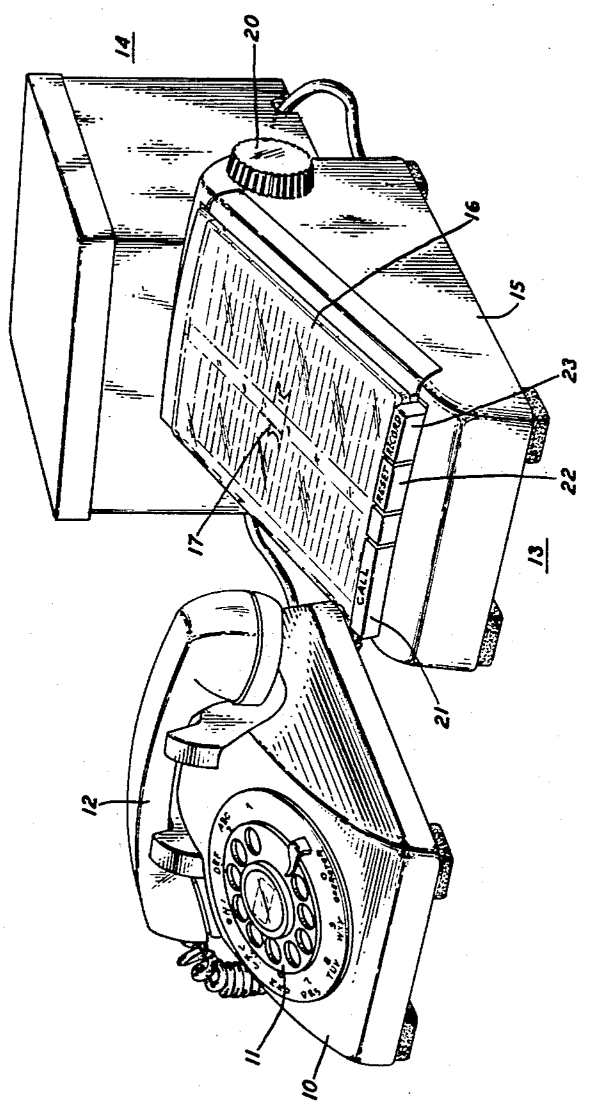

Referring now to Fig. 1, a typical telephone subscriber station apparatus employing this invention may be seen. It includes a telephone desk set 10 including a dial 11 and mounts a handset 12. Associated with the telephone set is a repertory dialer 13 of this invention and a control unit 14 therefor. The repertory dialer includes a housing 15 having a sloping transparent top surface 16 overlying a display of names of frequently called subscribers. Also underlying the transparent cover is a name indicator or pointer 17 which is movable along the name display under the control of a selector knob 20 located on the side of the housing. Below and in front of the name display are three operating controls, the call button 21, the reset button 22 and the record button 23 in a single line. The call button 21 positioned at the left is used to initiate a call using the repertory dialer to the party over whose name the indicator 17 is currently positioned. The record button 23 shown at the right, is employed by the subscriber to record the numbers of parties in the repertory dialer 13 by employing the dial 11 of the telephone set 10 to dial numbers into the repertory dialer. Consequently the subscriber will insert in the name display a card opposite the channel after recording the number. The reset button 22 is used both as an end of recording key, to reset the dialer after a number has been recorded and also to rapidly reset the dialer to its normal position after the initiation of either the record or call cycle without waiting for the completion of such a cycle. This button 22 may be used at the end of every recording cycle to complete the recording of a number in the dialer. It may also be used, for example, in recording when the subscriber recognizes immediately thereafter that he has dialed an incorrect digit, in which case he would then re-record the number, or on calls if he decides not to complete the call initiated by operation of the call button 21.

Figure 2A:
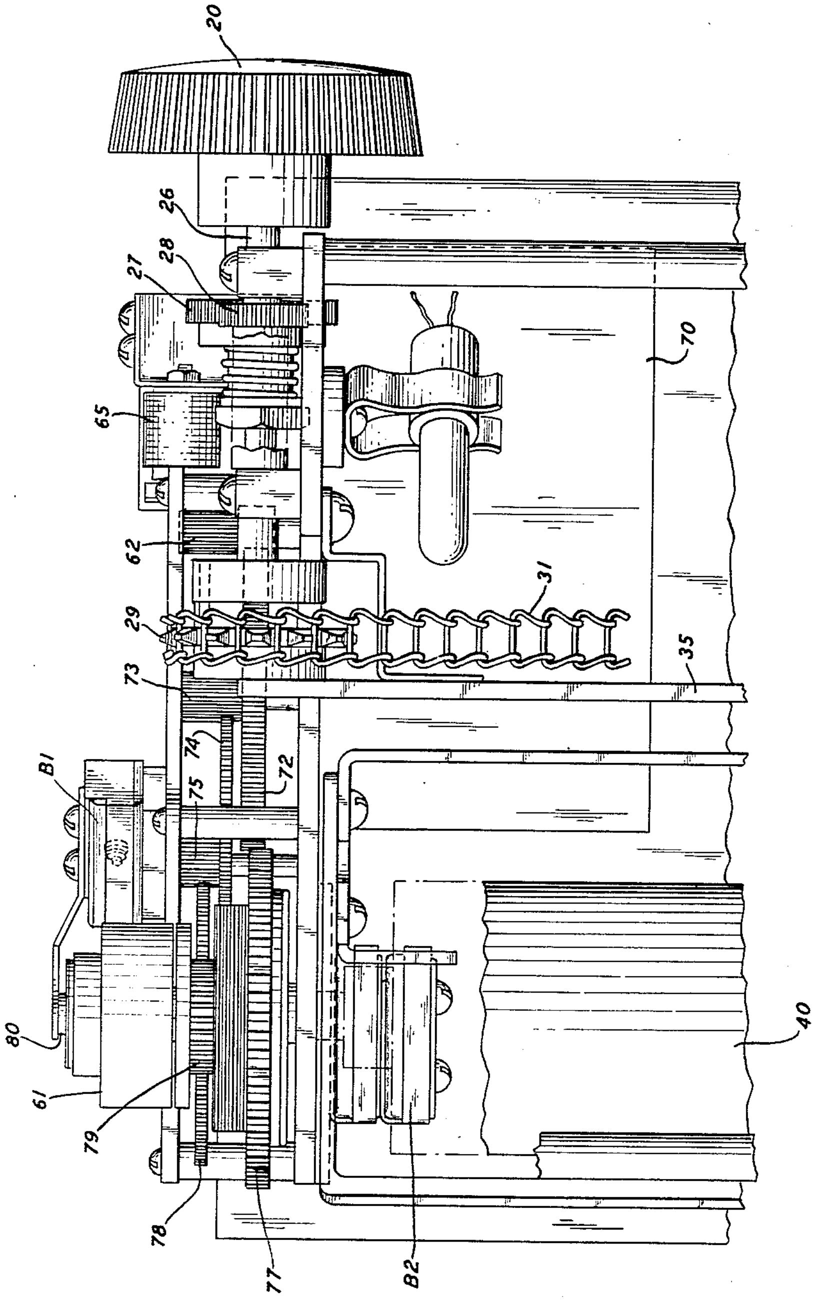
Figure 2B:
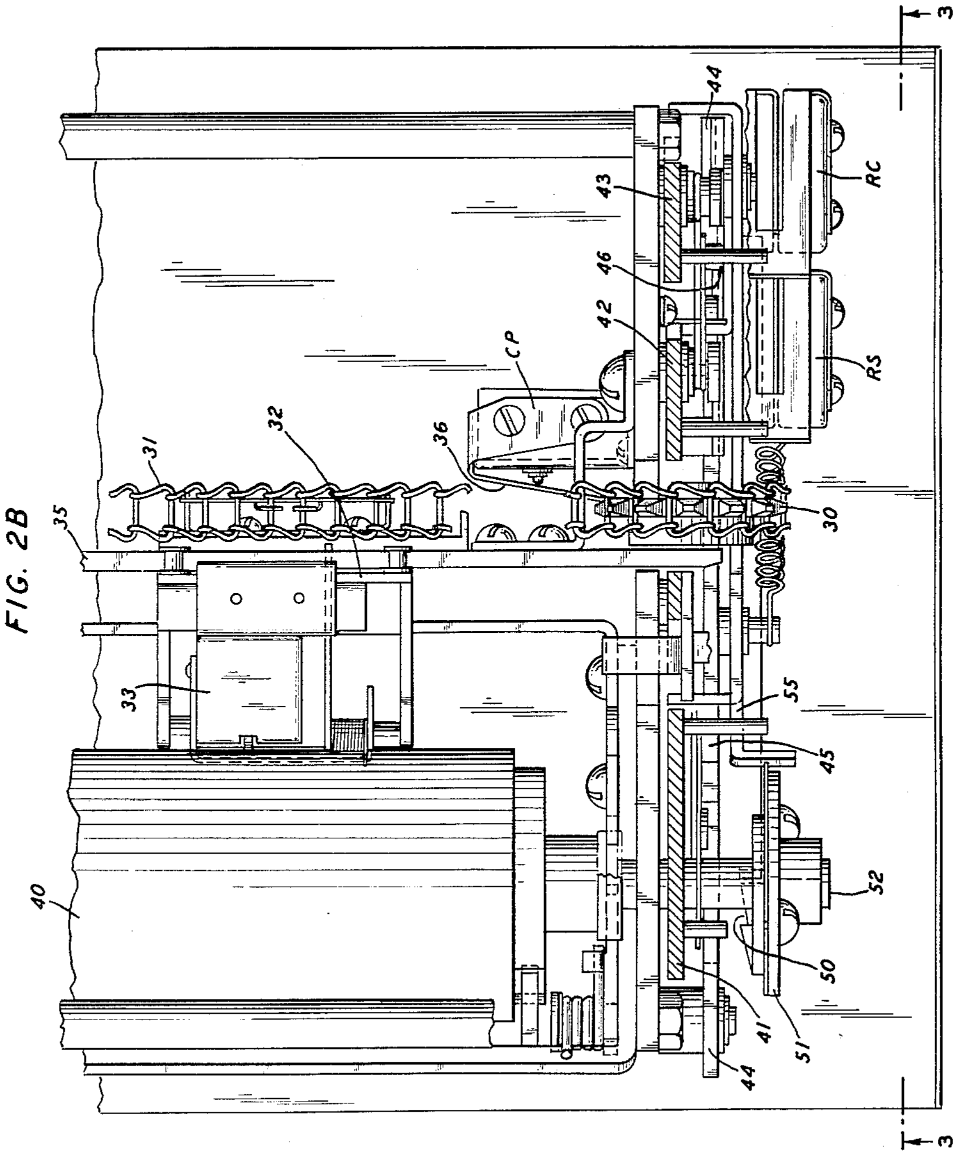
Figure 3:
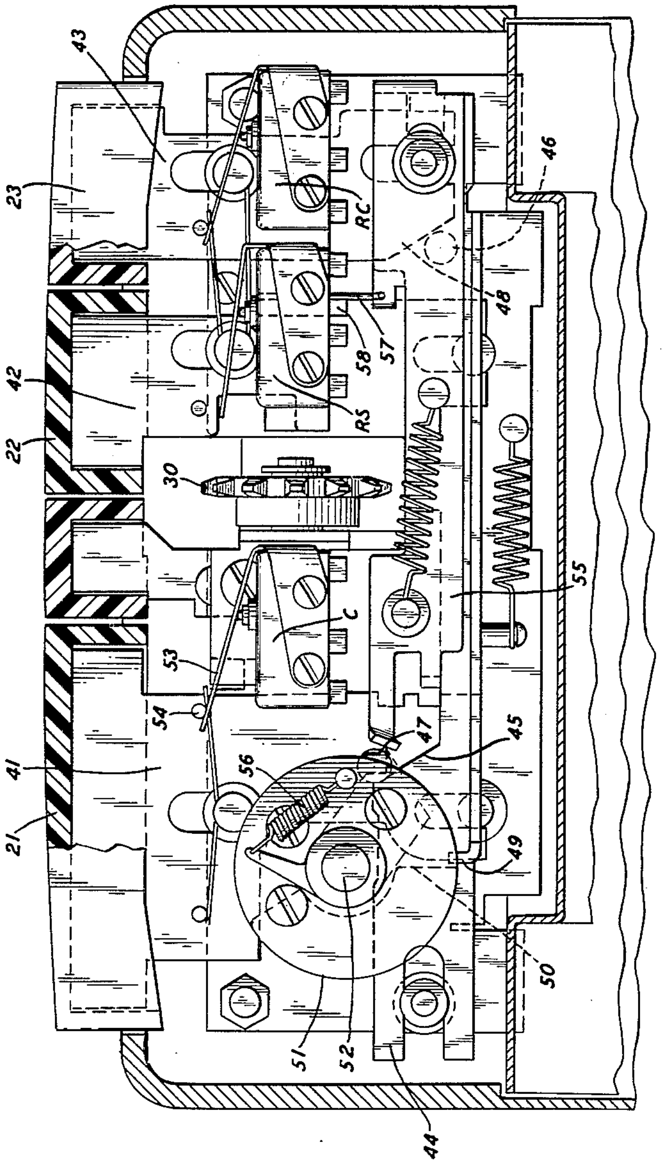
Fig. 3 is a vertical sectional view of the repertory dialer taken along the line 3—3 of Fig. 2B with portions shown in phantom form and other portions broken away.

An understanding of the mechanical relationship of the apparatus of this invention may be had by reference to Figs. 2A, 2B, 3 and 4. Referring now to Figs. 2A and 2B, the selector knob 20 may be seen coupled through a shaft 26, a spring loaded friction clutch 27 and gearing 28 to a sprocket 29. Riding over the sprocket and a similar freely journaled sprocket 30 is an endless chain 31 to which is secured a carriage 32 carrying a record-reproduce head 33. The carriage 32 is slidably mounted on a track 35 and may be driven along the track by the chain 31 upon rotation of the selector knob 20. Near the lowermost position, the carriage 32 strikes the operating arm 36 of a microswitch CP, the closure of which indicates the position of the carriage and which may be arranged to be actuated when the carriage is positioned, for example, at either of the two lowest channel positions. The head assembly 33 mounted by carriage 32 is positioned for movement along a magnetic drum 40 which may, for example, be a nickel cobalt plated brass tube having a length of six inches and a circumference of 4.75 inches. The selector knob is arranged to move the recording head sufficient to provide fifty channels .042 inch wide extending around the circumference of the drum.

Aligned at the front of the assembly in Fig. 2B are the plungers 41, 42 and 43 associated with the call button 21, reset button 22 and record button 23. Extending parallel to these plungers and in front thereof is an advance bar 44 including a sloping surface 45 and pin 46, best seen in Fig. 3, which cooperate with a pin 47 and sloping surface 48 of the plungers 41 and 43, respectively. This advance bar 44 is advanced to the left upon the depression of either the call button 21 or record button 23 by the camming effect of sloping surfaces 45 and 48. An integral tab 49 of advance bar 44 initiates the rotation of the magnetic drum 40 in the order of ten degrees by movement against a sector spring element 50 secured to flange 51 which is compliantly coupled to the drum shaft 52 by a spring 56. Positioned in front of the advance bar 44 and extending parallel thereto is a lock bar 55 which upon movement of the advance bar to the left is similarly drawn to the left thereby locking the operated plunger down and the unoperated plunger up. The reset plunger 42, however, is not locked in the up-position, but if operated after the lock bar 55 has moved to the left, then it is locked down by spring 57 which engages surface 58 of reset plunger 42. Associated with the call button 21 is a microswitch C having an actuating arm 53 positioned under a pin 54 on the plunger 41. Microswitches RS and RC are mounted for actuation similarly by the reset and record plungers 42 and 43, respectively.

Figure 4:
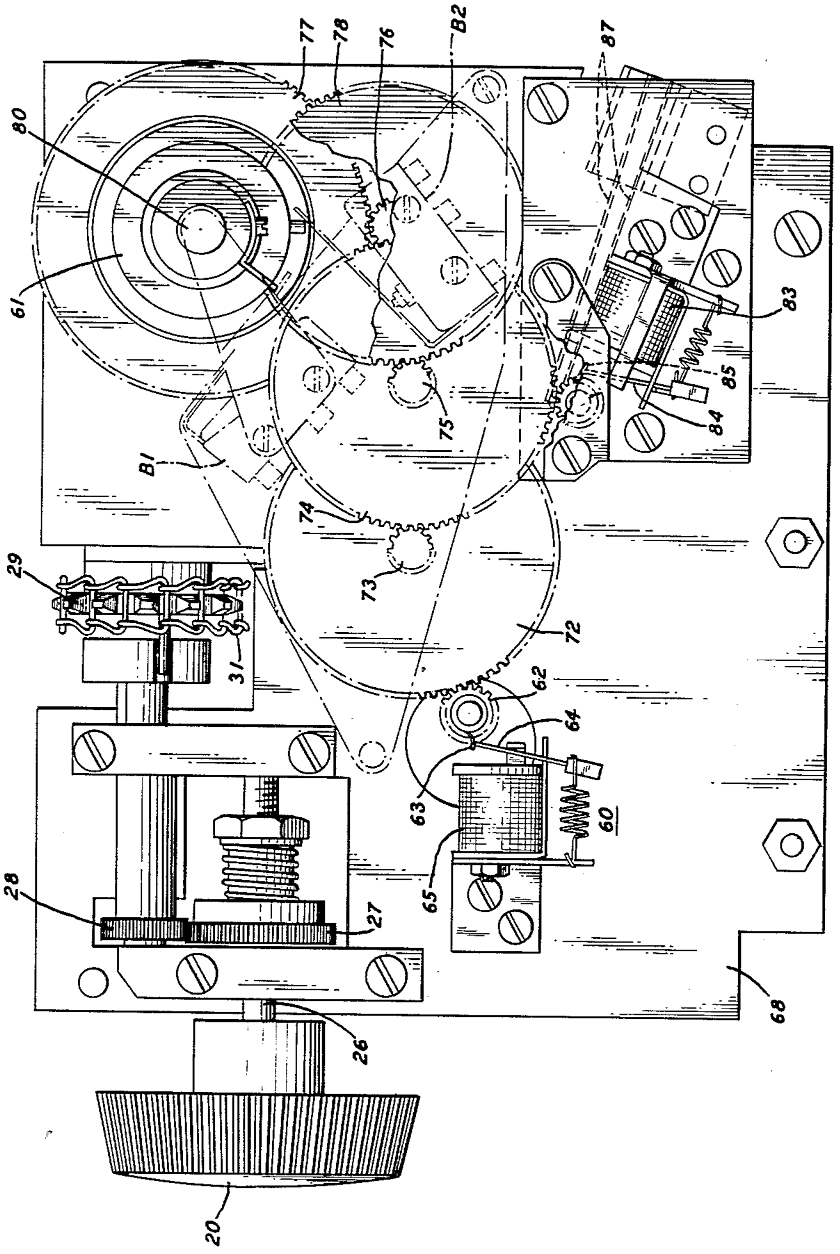
Fig. 4 is a vertical sectional view of the repertory dialer taken along line 4—4 of Fig. 2A with portions shown in phantom form and others broken away.

Referring now to Fig. 4, the driving gears of the magnetic drum 40, as well as a power clutch 60 and rapid reset clutch 61, may be seen. A motor 70 positioned behind the plate 68 and shown in Fig. 2A is coupled to drive gear 62 through a clutch band 63 which is normally in its non-driving condition. The end of the band is restrained by the armature 64 of the power clutch solenoid 65. When the band 63 is released by operation of the power clutch solenoid 65, the motor 70 drives the drum 40 through gears 62, 72, 73, 74, 75, 78, 76, and 77 in that order. Gear 78 which is coupled directly to the same shaft as gear 76 and which is driven by gear 75, also drives gear 79 which is coupled through the reset clutch 61 to the magnetic drum shaft 80. The reset clutch 61 is normally in its non-driving position but, upon its actuation, allows gear 79 to drive the drum 40 at a much higher rate than the gear 77 by overriding gear 77 of the drive system. This arrangement allows the drum 40 to be driven at two speeds, one for normal recording and calling and the other for rapid resetting of the drum. Shown in phantom in Fig. 4 is a microswitch B2 which is operated once for each revolution of the drum after the drum has been advanced fifteen degrees. This microswitch constitutes the blanking contacts B2 of the control circuit shown in Fig. 6 and is employed during a recording cycle to enable the power driving system after the initial mechanical advance of the drum by depression of the record button in order to provide fifteen degrees of rotation to position the drum in the correct position relative to a second blanking switch B1. This microswitch B1 similarly is mounted for operation upon advance of the drum an additional five degrees.

A solenoid 83 including armature 84 is mounted so as to restrain the free end of a band clutch 85 coupled to a gear 86 similar to the arragement of the power clutch solenoid 65. Coupled to the gear through the band clutch is a pulsing cam, not shown, and its associated contacts 87 similar to the type employed in a conventional dial as may be seen in the Patent 2,563,581 to H. R. Clarke et al. issued August 7, 1951.

*Control circuitry*

Referring now to Figs. 5, 6, and 7 which disclose a combination electrical and mechanical schematic diagram of this apparatus, a standard telephone set of the type described in the Patent 2,620,402 to N. Botsford et al. issued December 2, 1952, may be seen in Fig. 5.

The telephone set 10 is connected to the telephone system through three conductors $L_1$, $L_2$, and G comprising the telephone line TL. The set 10 includes a speech circuit having a transmitter T, a receiver R, an induction coil I having four windings, an impedance balancing network Z, and a pair of click reducing diodes CR all connected as a conventional speech circuit to the conductors $L_1$ and $L_2$. Also connected across the conductors $L_1$ and $L_2$ are protective diodes PD. Connected between the conductor $L_2$ and the grounded conductor G of the telephone line TL is a ringer or bell B. A switchhook SH, shown in its operated or raised condition, includes contacts $SH_1$ which completes the circuit of the conductor $L_1$ upon lifting of the handset for normal use of the telephone set 10. The switchhook SH also includes normally open contacts $SH_2$ associated with the repertory dialer 13 of Fig. 6. The telephone calling dial completes the telephone set and includes pulsing contacts PC which are normally closed but upon the actuation of the dial finger wheel open to interrupt the current flowing from the telephone central office through the conductor $L_1$ a number of times indicative of the digit dialed. The central office direct current path is through conductor $L_1$, closed contacts $SH_1$, the transmitter branch including windings $I_1$ and $I_2$ of the induction coil I, the transmitter and resistance $R_1$ and conductor $L_2$.

In addition to the pulsing contacts PC, the dial also includes off-normal contacts ONC which short the receiver R through the combination of leads ON, the auxiliary switching and power unit of Fig. 7 and leads 100 and 101 upon actuation of the dial in order to minimize transient noises during dialing.

Referring now to Figs. 6 and 7 wherein the control circuitry and mechanical components of the apparatus may be be seen in schematic form, the call button 21 and record button 23 mount translating members such as pins 105 which upon depression of the buttons move the advance bar 44 to the left. The advance bar 44 includes a pivoted arm 106 contacting a cam 51 coupled to the main drive shaft 52 of the magentic drum 40. The drum 40 is driven further by the motor 70 under control of the switching circuitry hereinafter described. The motor 70 mechanically is coupled through a power clutch 60 to low speed gearing 107 to the main drive shaft 52. The motor 70 also is coupled through the power clutch 60 to high speed gearing 108 which in turn is connected through the normally inoperative reset clutch 61 to the main drive shaft 52. The low speed gearing 107 is coupled to the main drive shaft 52 through an overrunning clutch 109 whereby both the low and high speed drive systems may drive the drum 40 simultaneously.

The motor 70 also drives a pulsing cam 110 through a band clutch 85 which is conditioned for power transmission upon operation of the pulsing solenoid 83. The motor is operated, for example, by 110 volts alternating current while the power clutch 60, the reset clutch 61, the pulsing solenoid 83 as well as the switching relays of Fig. 7 are advantageously operated by direct current furnished by a power supply 111 shown in Fig. 7.

The operating circuit of the motor comprises the power source 114, lead 115 connected thereto, the back contact $RC_1$ of the record button RC, lead 117 to the motor and the return lead 118 through the drum position contact $X_2$ and lead 119. Upon the depression of the record button RC a temporary alternative energizing path exists from lead 115 through the front contact $RC_1$ of the record button RC, lead 116, the blanking contact $B_2$ and lead 117. This circuit remains closed after depression of the record button RC until the magnetic drum 40 has advanced approximately fifteen degrees whereupon the blanking contact $B_2$ opens. Then the operating circuit extends from lead 115 in Fig. 7 via lead 122, the normally open contact $O_1$ of the relay, lead 123, lead 117 and the off-normal contacts ONC of the dial. Employing this circuit arrangement, upon operation of the record button contacts RC and the advance of the drum 40 of fifteen degrees, the motor and the drum 40 are under control of the dial.

Advance of the drum 40 by the motor 70 as described in the preceding paragraph presumes that the power clutch 60 be in its power transmitting condition. This is accomplished in a similar manner to the arrangement for the motor 70 by power supply lead 124 through lead 125, the drum position contacts $X_1$, lead 126, the back contact $RC_2$ of the record button lead 127, a dropping resistor $R_1$, the power clutch winding and to ground. When the record button 23 is operated a temporary alternative path bypassing the back contact $RC_2$ exists through the front contact $RC_2$, lead 130 and blanking contact $B_2$ and lead 131. The power clutch 60, as motor 70, is controlled by the off-normal contacts ONC of the dial after the opening of the blanking contacts $B_2$ upon fifteen degrees of drum 40 advance. The off-normal control path includes the lead 126, contacts $O_3$ of the off-normal relay, lead 129 and lead 127.

The recording elements of the apparatus include the recording head 33, direct current supply 111, the switching relay S which connects the power supply to the recording head 33 and the pulsing contacts PC of the dial which determine the polarity of the direct current flowing through the recording head 33 and therefore the direction of magnetization of the drum 40. The recording head 33 has one end of its winding connected to ground and the other terminal connected via lead 132, the back contact C of the call button and lead 133 to the recording network 135 comprising resistances $R_3$ and $R_4$ of different magnitude, e.g., 3000 ohms and 1300 ohms, respectively. The resistance $R_3$ has the opposite terminal connected via lead 136, contact $S_2$ of the switching relay S and lead 137 to a negative terminal of the power supply 111. The resistance $R_4$ on the other hand is connected through lead 138, front contact $S_7$ of the switching relay S, one of the leads P to the pulsing contacts PC of the dial and return pulsing lead P, the front contact $S_6$ of the switching relay S and lead 140 to a positive terminal of the power supply 111.

During the process of recording in which the recording button 23 is depressed the switching relay S is operated and the dial is off-normal allowing the drum 40 to rotate, current in the order of seven milliamperes flows from the power supply via lead 140 through $R_4$ and is opposed by the current of 3.5 milliamperes flowing in the opposite direction through resistance $R_4$ to the negative terminal of the power supply 111 via lead 137. The net current is 3.5 milliamperes flowing toward ground through the recording head 33. Upon opening of the pulsing contacts PC in the dial the seven milliampere current is interrupted and the 3.5 milliamperes flow from ground toward the negative lead 137 of the power supply 111. Therefore recording upon the magnetic drum 40 is accomplished by flux reversals upon the opening and closing of the contacts PC of the telephone dial.

The control of the operation of this apparatus and the sequence of operation is determined, in addition to the manual controls, by the relay network made up of (1) the switchhook relay H which reflects the condition of the switchhook contacts of the telephone set, (2) the off-normal relay O which is controlled by the off-normal contacts ONC of the telephone set dial, (3) the switching relay S which connects the dial to the magnetic drum system in recording and effects the substitution of the repertory dialer for the telephone set dial in calling, and (4) the automatic reset relay A which is employed in conjunction with the reset button 22 to effect the automatic rapid reset of the magnetic drum 40 and termination of either a recording or call cycle.

The recording head 33 normally is connected to the recording network 135 by the lead 132 and the back contact C of the call button 21. The front contact C which is closed upon call button 21 operation connects the recording head 33 via lead 141 to the input of an amplifier 144 which operates the amplifier relay 150 through leads 142. The contacts of amplifier relay 150 complete the operating circuit of the pulsing mechanism which comprises the series connection from ground through the winding of the pulsing solenoid 83, dropping resistor $R_2$, lead 146 to the relay 150 and over conductor 147 the contacts $A_2$ of a relay A, conductor 148, blanking contacts $B_1$, lead 149, lead 126 to the contacts $X_1$ of the drum position switch X and thence to the power supply lead 124 via lead 125. The amplifier 144 which shapes the pulse scanned by the recording head 33 as well as amplifying it has additionally power input leads 151, 152, and 153 from the power supply 111.

The pulsing solenoid has an armature coupled to a band clutch 85 in the drive system between the motor 70 and a cam 110. The cam 110 is contoured to maintain a set of pulsing contacts 161 open for approximately sixty percent of each revolution and allow them to close for the remaining forty percent. These pulsing contacts 161 are substituted for the pulsing contacts PC of the telephone set upon operation of the switching relay S through the connections including leads 162 and 163, the first of which joins the telephone line conductor $L_1$ directly and the second of which is connected to $L_1$ through contact $S_8$ of the switching relay S and lead 164.

Operation of the repertory dialer 13, such as recording normally accomplished with the handset 12 on the cradle and calling occasioned after the apparatus is connected to the telephone line upon lifting of the handset 12, requires a recognition in the control circuitry of the status of the handset 12. This is accomplished employing the switchhook relay H which reflects the condition of the switchhook. Closure of the switchhook contacts $SH_2$ upon lifting of the handset completes the energizing circuit of the relay H from the power supply 111 through the pair of leads SH, the winding of the switchhook relay H and to ground. Replacement of the handset 12 upon the cradle effects the opening of contacts $SH_2$ and the release of the relay H. An alternative operating path for the relay H exists when the magnetic drum 40 is displaced from its at rest position and the reset button 22 is operated. That alternate operating circuit from the power supply lead 124 extends through lead 125, contacts $X_1$, lead 126 to the front contacts $RS_1$ of the reset button 22 and thence via lead 170 and blocking diode 171 to the winding of the relay H.

The automatic reset relay A is the switching element which in effect remembers the condition of the handset relay H at the start of the cycle and thereupon conditions the repertory dialer for rapid resetting of the magnetic drum 40. The relay A is energized by the power supply over lead 124 through the $X_1$ contacts and the contacts $H_2$ of the handset relay H, as well as the blanking contacts $B_1$, if the handset is lifted before the opening of the contacts $B_1$, i.e., before the commencement of the cycle. The energizing path from the power supply over lead 124 is over lead 125, contact $X_1$, lead 126, lead 149, the front contact $B_1$, lead 172, back contact $H_2$ of the relay H, lead 173, back contact $RS_2$ of the reset button 22, lead 174, through the winding of the relay A and then to ground. The relay A upon operation locks up over its own contacts $A_1$ across the lead 125 from the power supply lead 124 and the lead 173.

The rapid resetting of the drum 40 and termination of the current cycle results upon the operation of the reset clutch 61. The energizing circuit of the reset clutch 61 extends from the power supply lead 124 via lead 125 to the contact $X_1$ and then over leads 126 and 149 the back blanking contact $B_1$ from which the circuit extends over lead 148 to the contacts $A_2$ of the automatic reset relay A. The front contact $A_2$ is connected to the back contact $H_3$ of the switchhook relay H and the front contact $H_3$ similarly is cross-connected to the back contact $A_2$. The circuit is completed through lead 180, the reset clutch winding and to ground. The cross connections of the relays A and H are responsible for the energizing of the reset clutch under the condition that one, and only one, of the relays A or H is operated.

Completing the switching circuitry of the repertory dialer 13 is off-normal relay O which controls the operation of the power clutch 60 and motor 70 during both recording and reset cycles and short circuits the telephone receiver R during repertory dialing for click protection. The relay O is operated only when the magnetic drum 40 is displaced from its at rest position similar to the switching relay S and the handset relay H due to the presence of the contact $X_1$ in its energizing circuit. The relay O is under the control of the off-normal contacts of the dial during recording through the circuit including the power supply lead 124, the contact $X_1$, lead 126, lead 181, the front contact $S_5$ of the switching relay S, the off-normal contacts ONC of the telephone dial over leads ON, the front contact $S_4$, lead 182 and ground. Alternatively if the switching relay S is not operated during recording while the automatic reset relay A is operated the energizing path for the relay O includes the front contacts $A_4$ and $A_5$, the leads 183 and 184 and the back contacts $S_4$ and $S_5$ instead of the front contacts $S_4$ and $S_5$. The off-normal relay O is operated similarly to the reset clutch 61 during the automatic resetting operation via the relays H and A when one or the other is operated. The operating circuit includes leads 182 and 187, either the back or front contact $A_3$ of the automatic reset relay A and the respective front or back contact $H_4$ of the switchhook relay H, leads 184 and 148, blanking contact $B_1$, lead 149, lead 126, the contact $X_1$ and power supply lead 124. The off-normal relay O, in short the telephone receiver R during repertory dialing, also is connected to be energized upon operation of the amplifier relay which drives the pulsing solenoid 145. This is accomplished through lead 185 connected to the output lead 146 of the amplifier relay 150, the lead 185 including a blocking diode 186 is coupled to the winding of the relay O through the lead 182. The off-normal relay O includes a shorting contact $O_2$ which insures slow release (e.g., 150 milliseconds) after operation to provide continuing click protection for the telephone receiver.

*Operation*

One feature of this invention described above is that the repertory dialer is used with a standard telephone set without modification and which is continually conditioned for normal use without interference from the repertory dialer. Therefore the switchhook contacts $SH_1$ associated with the handset serve to connect the telephone set to the line TL upon the lifting of the handset and the dial pulsing contact PC serve to interrupt the central office direct current upon the actuation of the dial, the number of times being indicative of the digit dialed. Similarly the off-normal contacts ONC of the dial which close upon the displacement of the dial finger wheel from the rest position serve to short the telephone receiver during dialing. These functions are all unchanged. These elements of the telephone set, however, also form part of the switching circuit of the repertory dialer and initiate, control and terminate its cycles of operation. This may be understood in the following description of repertory dialer operation.

In order to employ this equipment it is necessary that the subscriber first record numbers on the magnetic drum 40 by simulating dialing the party but with the handset in its normal position on the telephone set cradle, i.e., with the switchhook contacts $SH_1$ and $SH_2$ open and the telephone set disconnected from the line TL.

The subscriber positions the indicator 17 opposite one of the channels in the name display 16 and depresses the record button 23 which closes line switch LS applying power to the power supply 111. Depression of the record button 23 by closure of the front contacts $RC_1$ and by closure of contacts $X_2$ due to the mechanical advance of the drum energizes the motor 70. Upon the rotation of fifteen degrees the blanking contact $B_2$ in the motor circuit opens whereupon the motor 70 is de-energized. Since an alternative circuit path for energizing the motor exists through the off-normal contacts ONC of the telephone dial button thereafter any further movement of the drum 40 is under the control of the dial, i.e., the drum 40 moves whenever the dial is displaced from its rest position. The subscriber then operates the dial in the proper sequence of digits. As the dial runs down and stops with the opening of the off-normal contacts ONC, the drum 40 stops also. The recording of a number upon the magnetic drum is accomplished in the following manner: Upon operation of the record button 23 the switching relay S is operated by the power supply lead 124 through lead 125, contact $X_1$ on the drum shaft 52, leads 126 and 149, the front contact of the blanking contact $B_1$, lead 172, and normally closed contact $H_2$ of the handset relay HS and lead 188. Operation of the S relay applies a current of, for example, 7.0 milliamperes to the recording network 135 flowing from the power supply 111 through lead 140 through contact $S_6$, the closed dial pulsing contacts PC, through the front contacts $S_7$ and lead 138 through resistance $R_4$, the back contact C of the unoperated call button 21 and through the winding of the magnetic recording head 33. Simultaneously a current in the opposite direction flows from ground through the recording head 33, the back contact of the call button C, the resistance $R_3$, lead 136, contact $S_2$ and to the negative voltage supply lead 137 of the power supply 111. The algebraic sum of the current produces a current of in the order of 3.5 milliamperes flowing through the magnetic recording head 33 to ground. This current magnetizes the region adjacent to the recording head gap to saturation in one direction. As the dial begins its return travel and the dial pulsing contacts are opened, the 7.0 milliamperes current flowing toward ground is interrupted. The current which then flows through the recording head 33 is the 3.5 milliamperes from the negative terminal of power supply 111 passing through the resistance $R_3$. Therefore the recording of digits upon the magnetic drum is accomplished by direct current flowing through the recording head with the dial pulses appearing as current reversals. Since the magnetic drum is magnetized to saturation in either direction depending upon the current flow, there is no need for any separate erasing step. New numbers are recorded directly over the old which are thereupon obliterated.

*Storage of transient numbers*

The above description shows how telephone numbers may be recorded on what may be termed as a semi-permanent basis. That is, that the numbers so recorded are intended for comparatively long term usage, sufficient at least to warrant the preparation of a name card and its insertion into the name display. Of course, the number may be replaced in a matter of seconds if so desired merely by recording a different number over it and by the replacement of the name card with the new one. This form of recording is done as described above with the handset on the cradle. There are occasions when the recording of a number for use in the immediate future is desirable, particularly the recording of the number during calling. An example of the use of this feature is the situation when a person to whom several calls will be made will be available on a certain number in the immediate future. Under such conditions, the number may be recorded on either of two temporary storage channels during the actual setting up of the first such call. To accomplish this the subscriber rotates the selector knob 20 to move the indicator 17 to one or the other of the temporary channels. They are the bottom two channels in the apparatus shown in Fig. 1. Movement of the recording head to either of these positions closes the carriage position switch CP in the relay switching circuit. Now upon the depression of the record button 23 the motor circuit is conditioned for operation under the control of the off-normal contacts ONC of the dial when the drum position contacts $X_1$ and $X_2$ are closed. The carriage position switch CP provides an alternative operating path around the contact $H_2$ of the handset relay for the switching relay from the power supply lead 124 through lead 125, the contact $X_1$, lead 126, the normally closed $RS_1$ contact of the rest button 22, lead 189, the carriage position switch CP, lead 190 and 188, the winding of the switching relay and to ground. Under these conditions recording is possible irrespective of the position of the handset. Therefore the subscriber merely must depress the record button, lift the handset and dial the number whereupon the dial impulses are transmitted over the telephone line and simultaneously recorded on the magnetic drum 40.

*Repertory calling*

Calling is accomplished employing this invention by setting the pointer opposite the correct name, lifting the handset whereupon the telephone set will be connected to the line and the depression of the call button 21 effects the closure of the line switch LS and energizing of the power supply 111. The switchhook relay H is then operated by the power supply through the leads SH and the switchhook contacts in the telephone set. Operation of the call button 21 mechanically advances the magnetic drum 40 through advance bar 44 and cam 51. The mechanical advance of the drum 40 effects the closing of the drum position contacts $X_1$ and $X_2$, the $X_2$ contact of which completes the power circuit of the motor 70 through the back contact $RC_1$ of the record button RC thereby starting the motor 70. The power clutch is similarly operated by the power supply lead 124. Operation of the call button also switches the magnetic head from the recording network 135 to the input of the amplifier 144. Upon movement of the magnetic drum 40 past the recording head 33 current is induced in the winding upon each transition from magnetic flux polarized in one direction to the other which appears as positive and negative pulses of current in the winding of the magnetic head 33. These signals are introduced into the amplifier 144 which has in the order of eighty decibels of gain to positive signal pulses. The output of the amplifier is connected to the winding of the amplifier relay 150 so that the amplified output operates that relay once for each recorded dial pulse. The time of operation of the relay may not be of sufficient length to interrupt the central office current directly. In order to insure proper waveshape of the dial pulses that are transmitted to the central office, the pulses are regenerated by a mechanical pulsing mechanism. The amplifier relay energizes the pulsing solenoid 83 through lead 146, and the armature of the solenoid is then operated releasing the end of band clutch 85 whereby the clutch conveys power to the pulsing cam 110 and allows it to complete one revolution whereupon the band clutch is again restrained. The pulsing cam is contoured to cause an opening of its associated pulsing contacts after twenty percent of one revolution to remain open for sixty percent of the revolution and then to close. The pulsing contacts are connected through leads 162 and 163 through contacts $S_8$ of the operated relays in the telephone set circuit in dial pulsing contacts which are temporarily ineffective to signal by the opening of the back contacts $S_5$ of the relays. The repertory pulsing contacts are therefore substituted for the dial pulsing contacts PC during repertory calling.

It is to be understood that the above-described arrangements are illustrative of the application of the principles of the invention. Numerous other arrangement may be devised by those skilled in the art without departing from the spirit and scope of the invention.

What is claimed is:

1. In combination a telephone set including a handset, contacts for connecting said telephone set to a telephone line responsive to the position of said handset and a dial for setting up calls, said dial having contacts for producing pulses for signaling and normally open contacts which are closed upon operation of the dial, repertory dialing means comprising a multiple channel storage medium, means including a transducer for recording from said dial and reproducing dial pulses recorded upon said medium, manual controls for conditioning for operation the recording and reproducing means, means responsive to the closure of said normally open contacts of said dial for moving said magnetic storage medium with respect to said transducer to allow the recording of dial pulses on said medium, and switching means responsive to the combination of the operation of said manual control for reproducing and the connection of the telephone set to the line for initiating the reproduction of recorded dial pulses over the telephone line.

2. The combination in accordance with claim 1 wherein said repertory dialing means includes switching means responsive to closure of said line connecting contacts for disabling the recording elements only of said recording and reproducing means whereupon recording of dial pulses is prevented when said telephone set is connected to the telephone line.

3. The combination in accordance with claim 2 wherein said switching means comprises a relay, an operating circuit for said relay including a power source, means responsive to displacement of said recording medium from its rest position, and means responsive to the connection of the telephone set to the telephone line, second relay means for connecting said transducer means for recording, and said second relay means being disabled by the operation of said first relay means.

4. The combination in accordance with claim 3 wherein said recording means comprises two sources of oppositely poled unidirectional current of different magnitude and said second relay means includes contacts for connecting said current sources to pass current through said tranducer, the current through said transducer being determined by the magnitude and direction of said current sources.

5. The combination in accordance with claim 4 wherein said switching means is operative to connect the dial pulsing contacts of said telephone set in series with the unidirectional current source of greater magnitude whereupon during recording said greater magnitude current source is interrupted upon each occurrence of dial pulsing contact opening and reversals of direction of current through said transducer result.

6. In combination a telephone set including a handset, contacts for connecting said telephone set to a telephone line responsive to the position of said handset and a dial for setting up calls, said dial having contacts for producing pulses for signaling and normally open contacts which are closed upon the operation of the dial, repertory dialing means comprising a multiple channel storage medium, means including a transducer for recording from said dial pulses and for reproducing said dial pulses recorded upon said medium, manual controls for conditioning for operation the recording and reproducing means, and switching means responsive to the combination of the operation of said manual control for reproducing and the connection of the telephone set to the telephone line by lifting of said handset for initiating the reproduction of recorded dial pulses over the telephone line, said storage medium having a first and a second group of recording channels, said switching means being responsive to the connection of the telephone set to the telephone line for disabling said recording means when the transducer is in position for recording on one of said first group of channels, said switching means being responsive to the positioning of said transducer opposite any of said second group of channels for overcoming said disabling means whereupon dial pulses may be recorded upon channels of said second group while said telephone set is connected to or disconnected from the telephone line.

7. The combination in accordance with claim 6 wherein said transducer is slidably mounted for positioning adjacent said first and second groups of channels and operates contacts when opposite the channels of said second group, said contacts providing a bypass of the disabling means.

8. In combination, a telephone set including contacts for connecting the telephone set to a telephone line and a dial having pulsing contacts for signaling and normally open contacts which are closed upon operation of said dial, a repertory dialer including a multiple channel recording medium, recording means including a transducer for recording dial pulses upon the channels of said recording medium and for reproducing dial pulses for transmission over the telephone line, relay means under control of said line connecting contacts for enabling said transducer means for recording of dial pulses when said line connecting contacts are open and for enabling said transducer means for reproduction of recorded dial pulses when said line connecting contacts are closed, and switching means for selectively transmitting dial pulses from said dial or said automatic dialer.

9. The combination in accordance with claim 8 wherein said repertory dialer includes motor means for moving said recording medium with respect to said transducer during recording and reproduction.

10. The combination in accordance with claim 8 wherein said repertory dialer includes cycle terminating means operative in response to a change in condition of said line connecting contacts during a cycle.

11. The combination in accordance with claim 10 wherein said cycle terminating means is conditioned for operation in response to movement of said recording medium.

12. A repertory dialer comprising a magnetizable medium having a plurality of channels thereon, recording-reproducing means including a transducer, said transducer mounted for selective positioning adjacent any of the channels of said magnetizable medium, a motor for moving said magnetizable medium with respect to said transducer along any of said channels, manual controls for initiating the movement of said magnetizable medium, and switching means responsive to both the movement of said magnetizable medium and the manual control operated for conditioning said recording-reproducing means for one of those functions.

13. The combination in accordance with claim 12 wherein said automatic dialer includes means responsive to movement of said recording medium for locking said transducer in position adjacent the recording medium during recording of reproducing cycles.

14. The combination in accordance with claim 12 wherein said repertory dialer includes recording means for magnetically saturating said recording medium during recording of a current series of dial pulses whereupon any previous is obliterated.

15. The combination in accordance with claim 12 wherein said repertory dialer includes means for magnetically saturating said recording medium during recording cycle termination following the recording of a series of dial pulses whereupon any record existing on the remainder of the channel is obliterated.

16. The combination in accordance with claim 12 wherein said repertory dialer includes means responsive to the operation of either of said controls for locking said manual controls in their current positions during the operating cycle initiated by the operated control.

17. The combination in accordance with claim 16 wherein said locking means in response to the position of the recording medium at the termination of the cycle releases said manual controls.

18. The combination in accordance with claim 12 wherein said repertory dialer includes means for terminating an operating cycle, said means comprising a high speed drive system for said recording medium, said high speed drive system being operable upon depression of a manual cycle termination control.

19. The combination in accordance with claim 18 wherein said high speed drive system is conditioned for operation in response to movement of said recording medium.

20. The combination in accordance with claim 18 wherein said repertory dialer includes means responsive to the approach of the recording medium to the end of a revolution for disabling said cycle terminating means.

21. The combination in accordance with claim 18 wherein said motor means and cycle terminating means are both simultaneously operative during cycle termination whereupon the approach of the recording medium to the end of a revolution and the disablement of said cycle terminating means, said motor continues to drive said recording medium.

22. The combination in accordance with claim 18 wherein said repertory dialer includes means responsive to the position of said recording medium for de-energizing said motor upon the completion of a revolution of said recording medium.

References Cited in the file of this patent

UNITED STATES PATENTS

| | | |
|---|---|---|
| 2,502,517 | Goldberger | Apr. 4, 1950 |
| 2,522,119 | Kaelin | Sept. 12, 1950 |
| 2,558,187 | Marrison | June 26, 1951 |
| 2,567,812 | Hickman | Sept. 11, 1951 |